(12) United States Patent
Trommelen et al.

(10) Patent No.: US 7,271,207 B2
(45) Date of Patent: Sep. 18, 2007

(54) BITUMINOUS COMPOSITION

(75) Inventors: Eric A. T. Trommelen, Amsterdam (NL); Martin C. van Dijk, Amsterdam (NL)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/508,908

(22) PCT Filed: Mar. 24, 2003

(86) PCT No.: PCT/EP03/03173

§ 371 (c)(1),
(2), (4) Date: Sep. 23, 2004

(87) PCT Pub. No.: WO03/082985

PCT Pub. Date: Oct. 9, 2003

(65) Prior Publication Data

US 2005/0222305 A1    Oct. 6, 2005

(30) Foreign Application Priority Data

Mar. 28, 2002  (EP) .................................. 02076278

(51) Int. Cl.
C08L 53/02  (2006.01)
C08L 95/00  (2006.01)
C08F 297/04  (2006.01)

(52) U.S. Cl. ........................... 524/59; 524/68; 524/71; 524/505; 525/271; 525/250; 525/314; 523/222

(58) Field of Classification Search .................. 524/68, 524/59, 71, 505; 525/314, 271, 250; 523/222
See application file for complete search history.

(56) References Cited

U.S. PATENT DOCUMENTS

| | | |
|---|---|---|
| 3,149,182 A | 9/1964 | Porter |
| 3,231,635 A | 1/1966 | Holden et al. |
| 3,238,173 A | 3/1966 | Bailey et al. |
| 3,239,478 A | 3/1966 | Harlan, Jr. |
| 3,265,765 A | 8/1966 | Holden et al. |
| 3,431,323 A | 3/1969 | Jones |
| RE27,145 E | 6/1971 | Jones |
| 4,405,680 A | 9/1983 | Hansen |
| 4,874,821 A * | 10/1989 | Agostinis et al. ........... 525/271 |
| 4,904,713 A * | 2/1990 | Vonk et al. .................. 524/68 |
| 5,051,457 A | 9/1991 | Gelles |
| 5,130,354 A | 7/1992 | Gelles |
| 5,308,676 A | 5/1994 | Gelles et al. |
| 5,447,775 A | 9/1995 | Gelles |
| 5,554,697 A * | 9/1996 | Van Dijk et al. ........... 525/314 |
| 5,718,752 A | 2/1998 | Kluttz |
| 5,854,335 A | 12/1998 | Heimerikx et al. |
| 6,133,350 A | 10/2000 | Kluttz et al. |
| 2003/0050395 A1 * | 3/2003 | Morishita et al. ............. 525/55 |
| 2004/0116582 A1 * | 6/2004 | De Keyzer et al. ......... 524/474 |

FOREIGN PATENT DOCUMENTS

| | | |
|---|---|---|
| CA | 1225177 | 8/1987 |
| DE | 3737439 | 2/1989 |
| EP | 0 940 440 | 9/1999 |
| EP | 1 097 969 | 5/2001 |
| WO | 00/56796 | 9/2000 |
| WO | 02/00787 | 1/2002 |
| WO | 02/00806 | 1/2002 |

* cited by examiner

Primary Examiner—Duane Smith
Assistant Examiner—Ives Wu
(74) Attorney, Agent, or Firm—Donna B. Holguin; Novak Druce & Quigg LLP

(57) ABSTRACT

A bituminous composition which comprises a bituminous component and a block copolymer which comprises at least two blocks of a conjugated diene and at least two blocks of a monovinylaromatic hydrocarbon, being of the general formula: $S_1$—$B_1$—$S_2$—$B_2$ wherein $B_1$ is a block of polymerized conjugated diene comprising at least 50 mole % isoprene having an apparent molecular weight of from 180,000 to 400,000, $S_1$ and $S_2$ are blocks of polymerized monovinylaromatic hydrocarbon having a weight average molecular weight of 12,000 to 40,000, and $B_2$ is a block of polymerized conjugated diene comprising at least 50 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35 wt. %.

11 Claims, No Drawings

BITUMINOUS COMPOSITION

FIELD OF THE INVENTION

The present invention concerns bituminous compositions having advantageous high and low temperature properties which are maintained over time giving an improved estimated service life when used in, for example, roofing applications. These advantageous properties are imparted by the use of a thermoplastic elastomeric block co-polymer having a particular structure and molecular weight.

BACKGROUND OF THE INVENTION

From U.S. Pat. No. 4,405,680 roofing singles are known having improved low temperature flexibility comprising a flexibilized mat prepared by impregnating a glass fiber web with the blend of an unblown asphalt (or bitumen) and a monoalkenyl arene-conjugated diene block copolymer, wherein the flexibilized mat is coated with a blend of an airblown bitumen and a filler.

From U.S. Pat. No. 5,308,676 a torchable roll roofing membrane is known which comprises a reinforcing mat which is saturated and coated with bituminous composition comprising a bituminous component and, optionally, an unhydrogenated block copolymer of a monoalkenyl aromatic hydrocarbon and a conjugated diolefin, and coated onto one surface, a bituminous composition comprising a bituminous component and a hydrogenated block copolymer of a monoalkenyl aromatic hydrocarbon and a conjugated diolefin.

From U.S. Pat. No. 5,051,457 a composition is known for use in roll roofing membrane applications which comprises (a) from about 93 to about 87 parts per hundred of a bituminous component having a penetration of less than about 125 dmm (decamilimeters) at 25° C. and (b) from about 7 to about 13 parts per hundred of a hydrogenated block copolymer of a monoalkenyl aromatic hydrocarbon and a conjugated diolefin having a contour arm molecular weight before hydrogenation of from about 105,000 to about 140,000 and a polystyrene content of from about 25% to about 37%.

From U.S. Pat. No. 5,130,354 a bituminous composition is known comprising a bituminous component and a silane functionalized polymer or an acid functionalized polymer of a conjugated diolefin, which may be used to saturate and coat the reinforcing mat of roll roofing membranes.

From U.S. Pat. No. 4,904,713 a bituminous composition is known comprising a bitumen, an elastomeric, optionally hydrogenated, block copolymer containing at least two alkenyl arene blocks A and at least one conjugated diene block B, and a polymer of a monoalkenyl arene of which polymer the number average molecular weight is in the range of 0.25 to 2 times the number average molecular weight of the polymeric blocks A. The bituminous composition has excellent elasticity, flexibility and adhesion properties, which render it especially suitable for use in roofing coatings.

From U.S. Pat. No. 5,447,775 a bituminous roofing composition is known that is especially useful to coat and/or saturate a roll roofing membrane. The composition comprises from 2 to 10 percent by weight based on block copolymer plus bitumen, of a block copolymer of a vinyl aromatic hydrocarbon and a conjugated diene, from 25 to 300 parts by weight per hundred parts of said block copolymer of an end block compatible resin which has a softening point above 100° C., and the balance being a bituminous material.

From U.S. Pat. No. 5,718,752 a bituminous composition is known comprising a bituminous component and a radial block copolymer of styrene and butadiene which has the generalized formula:

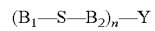
$$(B_1-S-B_2)_n-Y$$

wherein $B_1$ is a block of polybutadiene having a weight average molecular weight of from 2,000 to 8,000, S is a block of polystyrene having a weight average molecular weight of 10,000 to 30,000, $B_2$ is a block of polybutadiene having a weight average molecular weight of from 40,000 to 100,000, Y is a multifunctional coupling agent, and n is an integer from 3 to 6. This polymer modified bituminous position has improved processing viscosity and hence improved processability.

From U.S. Pat. No. 6,133,350 an oil-free bituminous composition is known which comprises from 80 to 98% by weight of a bituminous component, and from 2 to 20% by weight of an oil-free compound which comprises from 20 to 90% by weight of a block copolymer of a vinyl aromatic hydrocarbon and a conjugated diene optionally hydrogenated, from 10 to 70% by weight of a low viscosity amorphous polyolefin, and from 0.1 to 20% by weight of carbon black. The composition may be used for the production of single ply membranes as widely used in the roofing industry.

From U.S. Pat. No. 5,854,335 a bituminous composition is known which comprises a bituminous component and a block copolymer of a conjugated diene and a monovinylaromatic hydrocarbon, wherein the block copolymer has a vinyl content of at least 25% by weight based on the total diene content and a diblock content of 25 wt. % or less, whereas the diblock has an apparent molecular weight which is in the range of from 100,000 to 170,000. This composition is of use particularly in roofing applications.

From Canadian patent No. 1,225,177 a bituminous composition having improved stability is known comprising (a) 100-30 wt. % of a mixture of (1) 40-99.8 wt. % of a bituminous component having a penetration of less than 800 (decamilimeter) at 25° C., (2) 0.1-50 wt. % of a block copolymer having at least one thermoplastic monoalkenyl arene polymer block A and at least one elastomeric conjugated diene block B, and (3) 0.1-10.0 wt. % of a polystyrene-poly(ethylene-propylene) diblock copolymer, and (b) 0-70 wt. % of a filler.

It is thus known to use the above referenced block copolymers (generally referred to as styrenic block copolymers) in bituminous compositions and in particular in bituminous compositions for roofing applications.

In the roofing industry, modified bitumen membranes are generally applied by torching with open flame, or by mopping with hot bitumen or asphalt. Both methods can ensure a strong and watertight seam of overlapping membranes. However, mopping creates health and odour concerns while torching carries the risk of fire. Use of cold-applied solvent-based adhesives is growing rapidly but there are still limitations associated with VOC issues and long curing times.

A growing demand for self-adhesive roofing membranes, driven in part by insurance companies and legislation to increase the safety of the installation workers, stimulates the use of self-adhesive, bituminous roofing membranes, that can be applied without torching, hot bitumen or solvent-based cold adhesives.

Although there are regional differences, premium self-adhesive roofing compositions are generally composed of multiple components: bitumen/asphalt, a mixture of various styrenic block copolymers, (e.g., SBS, SIS and SB), tackifying resin, naphthenic oil, oxidised bitumen and filler. What components are used and in what amount is determined partly by the requirements for the final product. However, most importantly, this is strongly influenced by the kind of bitumen or asphalt that is used. In addition to the same high temperature performance requirements of conventional membranes, self-adhesive compounds have the additional requirement of being tacky at the lowest application temperature. This more stringent requirement of performance over a wide temperature range usually necessitates more complex compositions.

The three most important characteristics required in self-adhesive compositions are: flow resistance, low temperature tack and resistance to dis-bonding. The first two are primarily rheology requirements, while the latter is characterised by adhesive and cohesive strength. Rheological models exist for standard non-bituminous compounds, but with asphalt being the major component, the models no longer apply. Recent developments focus on simplifying the compositions and thereby easing its manufacture as well as that of the self-adhesive felt.

Surprisingly, a self-adhesive bituminous composition has been developed that satisfies the conflicting requirements.

SUMMARY OF THE INVENTION

Accordingly, the present invention provides a bituminous composition which comprises a bituminous component and a block copolymer which comprises at least two blocks of a conjugated diene and at least two blocks of a monovinylaromatic hydrocarbon, being of the general formula:

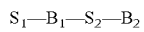

wherein $B_1$ is a block of polymerized conjugated diene comprising at least 50 mole % isoprene having an apparent molecular weight of from 180,000 to 400,000, $S_1$ and $S_2$ are blocks of polymerized monovinylaromatic hydrocarbon having a weight average molecular weight of 12,000 to 40,000, and $B_2$ is a block of polymerized conjugated diene comprising at least 50 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35 wt. %.

Moreover, the present invention provides a block copolymer which comprises at least two blocks of a conjugated diene and at least two blocks of a monovinylaromatic hydrocarbon, being of the general formula:

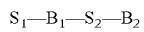

wherein $B_1$ is a block of polymerized conjugated diene comprising at least 50 moles isoprene having an apparent molecular weight of from 180,000 to 400,000, $S_1$ and $S_2$ are blocks of polymerized monovinylaromatic hydrocarbon having a weight average molecular weight of 12,000 to 40,000, and $B_2$ is a block of polymerized conjugated diene comprising at least 50 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35 wt. %.

The present invention further provides the use of the bituminous composition of the present invention as a coating, and self-adhesive shingles or roofing felt membranes comprising a substrate or mat to which has been applied the bituminous composition of the present invention.

DETAILED DESCRIPTION OF THE INVENTION

With the term "apparent molecular weight" as used throughout the specification is meant the molecular weight of a polymer except polystyrene itself, as measured with gel chromatography (GPC) using poly(styrene) calibration standards (according to ASTM 3536).

With respect to the block copolymer suitable conjugated dienes other than isoprene include for example 1,3-butadiene, 2,3-dimethyl-1,3-butadiene, 1,3-pentadiene, 1,3-hexadiene and others having from 4 to 8 carbon atoms. Mixture of such dienes with isoprene may also be used. Preferably, the blocks of conjugated diene comprise at least 80 mole % preferably at least 99 mole % isoprene.

Likewise suitable monovinyl aromatic hydrocarbons include styrene, o-methylstyrene, p-methylstyrene, p-tert-butylstyrene, 2,4-dimethylstyrene, α-methylstyrene, vinylnaphthalene, vinyltoluene and vinylxylene, or mixtures thereof. Preferably the blocks of polymerized monovinylaromatic hydrocarbon are made of styrene or a mixture comprising at least 80 mole % styrene, the former being preferred.

These blocks may comprise minor amounts of monomers other than conjugated diene, respectively monovinylaromatic hydrocarbons, provided the character of the polymer blocks is not substantially changed.

Of particular preference are the block copolymers poly(styrene-isoprene-styrene-isoprene), hereafter SISi polymers.

To achieve the balance of properties mentioned before, it is also important that the block copolymer satisfies the requirements in respect of the molecular weight of each polymer block. Thus, $B_1$ has preferably an apparent molecular weight of from 250,000 to 350,000. Likewise, polymer blocks $S_1$ and $S_2$ preferably each individually have a weight average molecular weight of 20,000 to 35,000. Moreover, polymer block $B_2$ preferably has an apparent molecular weight of from 30,000 to 52,500. The weight ratio W of $B_1$ over $B_2$ is preferably in the range of from 4.0 to 8.0 more preferably about 6.0. Finally, the content of polymerized monovinyl-aromatic hydrocarbon is preferably in the range from 15 to 30 wt. %, more preferably from 20 to 25 wt. %.

The above block copolymers are typically prepared by anionic polymerization. The preparation of block copolymers is well known to those skilled in the art and has been described in e.g. U.S. Pat. Nos. 3,265,765; 3,231,635; 3,149,182; 3,238,173; 3,239,478; 3,431,323; Re. 27,145, all incorporated herein by reference, and many handbooks including "Thermoplastic Elastomers, a comprehensive review" (1987), edited by N. R. Legge, G. Holden, H. E. Schroeder, Hanser publishers. Similar polymers are also described in German patent No. 3,737,439.

The block copolymers, which are useful as modifiers in the bituminous compositions according to the present invention, are preferably prepared by the well known full sequential polymerisation method, optionally in combination with reinitiation, but may also be made by the well-known coupling method.

It is thought that the block copolymer used as modifier in the bituminous composition of the invention may be novel, and therefore the present invention also extends to the polymer per se.

The bituminous component present in the bituminous compositions according to the present invention may be a naturally occurring bitumen or derived from a mineral oil. Also petroleum pitches obtained by a cracking process and coal tar can be used as the bituminous component as well as blends of various bituminous materials. Examples of suitable components include distillation or "straight-run bitumens", precipitation bitumens, e.g. propane bitumens, blown bitumens, e.g. catalytically blown bitumen or "Multiphate", and mixtures thereof. Other suitable bituminous components include mixtures of one or more of these bitumens with extenders (fluxes) such as petroleum extracts, e.g. aromatic extracts, distillates or residues, or with oils. Suitable bituminous components (either "straight-run bitumens" or "fluxed bitumens") are those having a penetration of in the range of less than 400 dmm at 25° C., with 50 to 250 dmm generally preferred. Therefore quite hard bitumens of a penetration of from 60 to 70 dmm may be used, but generally a straight run or distilled bitumen having a penetration in the range of from 150 to 250 dmm will be the most convenient to use. Both compatible as well as incompatible bitumens may be used.

The polymer modifier is suitably present in the bituminous composition in an amount in the range of from 6 to 30% by weight (based on the total of bituminous component and block copolymer), more preferably from 15 to 15% by weight.

The bituminous composition may also, optionally, contain other ingredients such as may be required for the end-use envisaged. Thus fillers may be included, for example fly ash, wood floor, siliceous fillers such as silicates, talc, calcareous fillers such as calcium carbonate, carbon black, or other components including resins, oils, stabilisers or flame retardants may be incorporated. The content of such fillers and other components may be in the range of from 0 to as much as 80% by weight, based on the weight of the mixture. Of course, if advantageous, other polymer modifiers may also be included in the bituminous composition of the invention.

The useful low temperature and high temperature properties of the polymer-bitumen blends of the present invention enables such blends to be of significant benefit in uses where the blends are exposed to external weather conditions, such as use in roofing applications, for example as a component of self-adhesive shingles or roofing felt membranes. The usefully low high-temperature viscosity not just means that the polymer-bitumen blends can be more easily processed but also means that they enable a greater amount of filler to be incorporated before the maximum allowable processing viscosity is achieved, and thus leads to a cheaper product in those applications where fillers are commonly used. The bituminous compositions may also find use in paving, carpet backing, coatings and such like.

Other applications in which the polymers themselves may be of use are in sound deadening, in adhesive, sealant or coating compositions and/or in vibration dampening compositions.

The following Examples is further illustrated by means of the following illustrative embodiments which are given for the purpose of illustration only and are not meant to limit the invention to the particular reactants and amounts disclosed.

EXPERIMENTAL

General Procedure for the Preparation of Polymer A

By the following process, the block copolymer of the present invention polymers was prepared:

2.59 kg of styrene were added to 120 kg of cylohexane at 50° C., after which 94.2 mmole of sec-butyl lithium was added. The reaction was completed after 40 minutes. Hereafter, 15.49 kg of isoprene was added in 10 minutes. The temperature of the reaction mixture rose to 70° C. The polymerisation was allowed to proceed at this temperature for 85 minutes. Hereafter, the second portion of 2.51 kg of styrene were added in 3 minutes. The polymerisation was allowed to proceed at 60° C. for 15 minutes whereupon a second portion of 2.58 kg of isoprene were added in 3 minutes. The isoprene was allowed to react to completion whereupon sufficient ethanol was added to terminate the polymerisation. After cooling down the reaction mixture, 0.6 wt. % of IONOL, relative to the weight of the polymer were added for stabilisation. The product was isolated by steam stripping to give white crumbs.

This polymer A, of type SISiS has the following characteristics: molecular weight (kg/mole): $S_1$=28.0, $B_1$=247.4, $S_2$=28.1, and $B_2$=40.2; PSC (wt. %)=22, and W is 6.2.

The polymer according to the invention is compared with the reference polymers listed in Table 1. This table also contains further components of the bituminous composition.

TABLE 1

| | |
|---|---|
| SBS1 | KRATON ® D1184, a branched block copolymer based on styrene and butadiene, frequently used as modifier of bitumen in roofing felt coating compounds, roads and pipe coating, having a PSC of 30 wt. % |
| SBS2 | KRATON ® D KX-219, an experimental branched block copolymer based on styrene and butadiene, having an elevated vinyl content of about 40 wt. %, and a PSC of 30 wt. % |
| SB | KRATON ® D1118, an 20/80 blend of SBS/SB block copolymer based on styrene and butadiene, having a PSC of 31 wt. % |
| SIS | KRATON ® D1163, a linear block copolymer based on styrene and isoprene, having a PSC of 15 wt. % |
| Oil | Naphthenic oil, N965 EDELEX ™ from Shell |
| Resin | Tackifying resin, HERCOTAC ™ 205 from Eastman |
| Bitumen A | PX200, a low asphaltenes (7 wt. %) content bitumen and highly compatible for polymers composed of 65% propane bitumen and 35% Bright Furfural extract |
| Bitumen B | B250, Ex Neste (Sweden) |
| Bitumen C | B200, ESSO/Nynas 50/50 (Germany) |
| Bitumen D | B160, Total (France) |

Preparation of Bituminous Compositions

Compositions as described in Table 2 were made with a Silverson L4R high shear mixer. The bitumen was heated to 160° C. and subsequently the polymer(s) and/or other additives were added. Upon blending, the temperature increased to 180° C. caused by the energy input from the mixer. Blending at this temperature was continued until a homogeneous blend was obtained, as determined by fluorescence microscopy.

Specimen for Adhesion Testing

The roofing sheets for adhesion testing (T-Peel ASTM D1876-93) were prepared by pouring 55 grams of the composition in a 230 mm by 160 mm by 1.5 mm spacer and covering with a polyester carrier. Covered with silicon paper, the sample was placed in a hydraulic press and pressed for five minutes with a load of 67.5 kN at 140° C. After a cooling period of ten minutes, a second spacer was placed on the other side of the carrier and filled with an additional 55 grams of compound. Pressing again created an artificial roofing sheet 3 mm thick. The roofing sheet thus created was cut from its spacers. Specimen for T-Peel testing measuring 25×200 mm were cut from the sheet.

Test Methods

A standard evaluation on the blends was carried out—the determination of the penetration at 25° C., softening point, viscosity, DIN flow resistance and cold bend. (F. de Bats, Analysis of the DIN flow test and cold bending test for water proofing membranes, 'green cover' issue of Shell International Petroleum Company Limited.)

T-peel testing: The adhesive performance of a formulation for self-adhesion was determined by welding two membranes of equal composition and subsequently separating them in a T-geometry with a tensile tester. The force (N/25 mm) necessary to separate the membranes is a measure of the adhesive bond strength.

The adhesive bond strength of the various compounds was determined at 5° C. and 21° C. Conditioning at 5° C. was achieved by placing the membranes in a refrigerator for at least 12 hours and welding immediately when taken from the refrigerator, followed by immediate T-peel testing. Specimens welded at ambient temperature were stored for at least 12 hours before peel testing. The welding at both temperatures was established by rolling a weight of 1.0 kg for 10 times over the membranes. Adhesion was prevented over a length of 50 mm by covering the ends of the membranes with silicon paper.

T-peel tests were carried out with an Instron 4501 tensile tester. The free ends were clamped in the grips and then separated at a constant rate of displacement of 254 mm/min according to ASTM D1876-93. (Annual book of ASTM standards, Volume 15.06, Standard test method for peel resistance of adhesives (T-peel test), ASTM D1876-93.)

Tack of the membranes is an important product parameter for quick bonding, especially at low (<10° C.) welding temperatures. In this investigation the tack was not analysed quantitatively. Rather, its performance was assessed manually. Tack may be quantified by standardised adhesive tests such as Polyken probe and loop tack.

SARA (Saturates Aromatics Resins Asphaltenes) analysis determines in broad sense the chemical composition of the bitumen. With the SARA method, the asphaltenes present in the bitumen were first separated from the maltenes by precipitation in n-heptane. Subsequently, the asphaltenes content was determined gravimetrically. The resins, aromatics and saturates remaining in the maltenes fraction were separated and quantified by means of HPLC. ("Rapid Bitumen Analysis by High Pressure Chromatography," Construction & Building Materials, Vol. 6, No. 3, 1992.)

Results

A coating for self-adhesion should have both good tack and adhesive strength, so one can 'put it down and forget it', especially at lower temperatures. However, commercially available styrenic block copolymers that provide these properties unfortunately provide insufficient flow resistance for typical roofing applications.

Table 2 presents the results of evaluations of various styrenic block copolymers in a 200 pen reference bitumen. These evaluations show the influence of the types of polymers and mixtures thereof on the adhesive and rheological properties, i.e. softening point R&B, DIN flow resistance and cold bend. In this pragmatic approach, the butadiene based styrenic block copolymers SBS1 and SBS2 (which are commonly used in roofing applications), only provide good Theological properties, while in this case the adhesive strength is rather poor, especially at low temperature. The SIS polymer gives excellent adhesion at low temperature. However, a flow resistance of 50° C. is not sufficient for adequate performance. Mixing SBS and SIS, to combine the desired adhesion and rheological properties provides a better balance. However, in this case the adhesive strength at low temperature has not significantly improved. Addition of SB di-block reduces the flow resistance and slightly improves the adhesion at low temperature.

The addition of naphthenic oil and tackifying resin increases adhesion for reasons described below. For this specific formulation a good balance in properties is obtained. Unfortunately, six different ingredients are required, which complicates production safety.

When the single block copolymer of the present invention was used in bitumen, a satisfactory balance was obtained between the adhesive properties and the typical Theological performance. The results observed easily match those of the compound with the multiple ingredients. However, with a single polymer the manufacturing process is greatly simplified.

TABLE 2

| | Experiment | | | | | | |
|---|---|---|---|---|---|---|---|
| | 1 | 2 | 3 | 4 | 5 | 6 | 7 |
| Bitumen A | 88 | 88 | 88 | 86 | 84 | 64 | 86 |
| SBS1 | 12 | — | — | — | — | — | — |
| SBS2 | — | 12 | — | 8 | 4 | 4 | — |
| SIS | — | — | 12 | 6 | 4 | 4 | — |
| SB | — | — | — | — | 8 | 8 | — |
| Polymer A | — | — | — | — | — | — | 14 |
| Oil | — | — | — | — | — | 10 | — |
| Resin | — | — | — | — | — | 10 | — |
| T-peel at 5° C., N | 10 | 6 | 48 | 11 | 15 | 33 | 38 |
| T-Peel at 21° C., N | 29 | 36 | 105 | 77 | 58 | 77 | 78 |
| R&B, ° C. | 120 | 128 | 75 | 118 | 110 | 102 | 121 |
| DIN flow, pass ° C. | 105 | 105 | 55 | 100 | 95 | 85 | 100 |
| Cold bend, pass ° C. | −40 | −30 | −30 | −35 | −40 | −30 | −35 |

T-Peel test according to ASTM D1876

Influence of the Bitumen on the Performance

Bituminous compositions for roofing application are mixtures of well-defined components. The primary component in a compound for self-adhesive roofing felts is the bitumen or asphalt. Although the components of the asphalt can roughly be divided in saturates, aromatics, resins and asphaltenes (SARA), it is still a mixture of multiple molecules of various length, polarity and structure, depending in composition and consistency on the crude oil processing of the oil used. There are too many uncertain parameters to call it a well-defined ingredient in terms of composition.

An indication of the effect of the asphalt on the quality of a self-adhesive compound is shown in Table 3. The results show the adhesive properties, T-Peel strength and tack, of the block copolymer of the present invention in various commercially available types of asphalt. Furthermore, SARA-analysis was carried out on the bitumens to obtain an indication of the composition.

TABLE 3

Influence of asphalt on adhesive performance -
Polymer 14 wt. % incorporated

|  | Experiment | | | |
|---|---|---|---|---|
|  | 8 | 9 | 10 | 11 |
| Polymer A | 14 | 14 | 14 | 14 |
| Bitumen | A | B | C | D |
| Pen, dmm | 190 | 234 | 174 | 176 |
| R&B, ° C. | 120 | 128 | 75 | 118 |
| Asphaltenes (%) | 6.0 | 6.8 | 11.2 | 7.9 |
| Saturates (%) | 5.7 | 11.7 | 10.5 | 10.1 |
| Aromatics (%) | 66.5 | 67.1 | 59.4 | 63.9 |
| Resins (%) | 21.8 | 14.5 | 18.9 | 18.2 |
| T-peel at 4° C., N | 42 | 27 | 31 | 1 |
| T-Peel at 21° C., N | 86 | 81 | 48 | 73 |
| Tack at 4° C., N | Very good | (very) good | Good | No |
| Tack at 21° C., N | Very good | Very good | (very) good | poor |

The effect of the asphalt on the tack and on the T-Peel strength at low temperature is manifest, in particular for Bitumen D. Unfortunately, the ratio and content of the components of the asphalt do not explain or clarify the differences found. There is no clear relationship between the asphaltene content or aromaticity and the adhesive properties of the blends with the various types of bitumen.

However, it must be noted that the results from the SARA-analysis do not give any information on the molecular weights and molecular weight distribution of the various components, which is an important factor with respect to the dissolving power and compatibility of the bitumen for polymer modification.

Furthermore, the above evaluations were carried out with the block copolymer according to the invention only. To exclude the potential fact that the above observed phenomena is due to Bitumen D, rather than inferior properties of the block copolymer according to the invention, evaluations were carried out with blends typical for a self-adhesive in bitumen D. The results of these evaluations are presented in Table 3.

TABLE 3

Performance of compounds for self-adhesive in Bitumen D.

|  | Experiment | | | | | |
|---|---|---|---|---|---|---|
|  | 11 | 12 | 13 | 14 | 15 | 16 |
| Bitumen D | 86 | 76 | 86 | 76 | 74 | 64 |
| SBS2 | — | — | 8 | 8 | 4 | 4 |
| SIS | — | — | 6 | 6 | 4 | 4 |
| SB | — | — | — | — | 8 | 8 |
| Polymer A | 14 | 14 | — | — | — | — |
| Oil | — | 10 | — | 10 | — | 10 |
| Resin | — | — | — | — | 10 | 10 |
| T-peel at 5° C., N | 1 | 34 | 1 | 10 | 0 | 49 |
| T-Peel at 21° C., N | 84 | 34 | 106 | 63 | 111 | 61 |
| Tack at 5° C. | No poor | Good good | No poor | Moderate good | No poor | Good good |
| Tack at 21° C. |  |  |  |  |  |  |

The results demonstrate that the block copolymer according to the invention is capable of performing similar to complex bitumen compositions, even when "difficult" bitumen are used.

Conclusions

Bituminous compositions whether in the form of compounds or coatings for self-adhesive roofing applications are often relatively complex due to the multiple components required. Each of these components plays an important role in creating the required balance of performance characteristics, flow resistance, low temperature tack and resistance to dis-bonding. The challenge is to obtain in one compound sufficient resistance against molecule mobility (flow) at high temperatures, while simultaneously maintaining sufficient viscous behaviour and mobility of molecules to create entanglements at low temperatures (adhesion).

Although the requirements of the final product are important in determining the mix of ingredients that should be introduced, of greater significance is the nature of the bitumen or asphalt that is used. The self-adhesive compounds must be tailored precisely. On the other hand production may be simplified tremendously by the use of a single polymer combining sufficient viscous and elastic behaviour in a single SBS or SIS block copolymer dedicated for this application.

The invention claimed is:

1. A bituminous composition for use in a self adhesive shingle or roofing felt, said composition comprising a bituminous component and a block copolymer, said block copolymer comprising at least two blocks of a conjugated diene and at least two blocks of a monovinylaromatic hydrocarbon of the general formula:

$$S_1-B_1-S_2-B_2$$

wherein $B_1$ is a block of polymerized conjugated diene comprising at least 80 mole % isoprene having an apparent molecular weight of from 180,000 to 400,000, $S_1$ and $S_2$ are blocks of polymerized monovinylaromatic hydrocarbon comprising at least 99 mole % styrene and having a weight average molecular weight of 12,000 to 40,000, and $B_2$ is a block of polymerized conjugated diene comprising at least 80 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35% wt.

2. The bituminous composition of claim 1, wherein polymer blocks $B_1$ and $B_2$ each independently comprise at least 99 mole % isoprene.

3. The bituminous composition of claim 1, wherein polymer block $B_1$ has an apparent molecular weight of from 250,000 to 350,000.

4. The bituminous composition of claim 1, wherein polymer blocks $S_1$ and $S_2$ each independently have a molecular weight of from 20,000 to 35,000.

5. The bituminous composition of claim 1, wherein the weight ratio W is in the range of from about 4.0 to about 8.0.

6. The bituminous composition of claim 1, wherein the weight ratio W is about 6.0.

7. The bituminous composition of claim 1, which comprises on the total weight of the bituminous composition from 70 to 95 W % of the bituminous component and from 30 to 5 W % of the block copolymer.

8. The bituminous composition of claim 1, wherein the bituminous component has a penetration of less than 300 dmm (decamilimeters) at 25° C.

9. A block copolymer which comprises at least two blocks of a conjugated diene and at least two blocks of a monovinylaromatic hydrocarbon, being of the general formula:

$$S_1-B_1-S_2-B_2$$

wherein $B_1$ is a block of polymerized conjugated diene comprising at least 80 mole % isoprene having an apparent molecular weight of from 180,000 to 400,000, $S_1$ and $S_2$ are blocks of polymerized monovinylaroniatic hydrocarbon comprising at least 99 mole % styrene and having a weight average molecular weight of 12,000 to 40,000, and $B_2$ is a block of polymerized conjugated diene comprising at least 80 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35% wt.

10. A coating comprising a bituminous composition that comprises a bituminous component and a block copolymer, said block copolymer comprising at least two blocks of a conjugated diene and at least two blocks of a monovinylaromatic hydrocarbon of the general formula:

$$S_1-B_1-S_2-B_2$$

wherein $B_1$ is a block of polymerized conjugated diene comprising at least 80 mole % isoprene having an apparent molecular weight of from 180,000 to 400,000, $S_1$ and $S_2$ are blocks of polymerized monovinylaromatic hydrocarbon comprising at least 80 mole % styrene and having a weight average molecular weight of 12,000 to 40,000, and $B_2$ is a block of polymerized conjugated diene comprising at least 80 mole % isoprene having an apparent molecular weight of from 15,000 to 60,000; wherein the weight ratio W of $B_1$ over $B_2$ is in the range of 3.0 to 12.0; and wherein the content of polymerized monovinylaromatic hydrocarbon is in the range from 10 to 35% wt.

11. The bituminous composition of claim 7, wherein polymer blocks $B_1$ and $B_2$ each independently comprise at least 99 mole % isoprene and the weight ratio W is in the range of from about 4.0 to about 8.0, polymer block $B_1$ has an apparent molecular weight of from 250,000 to 350,000, polymer blocks $S_1$ and $S_2$ each independently have a molecular weight of from 20,000 to 35,000.

* * * * *